US008573332B2

(12) United States Patent
Scott

(10) Patent No.: US 8,573,332 B2
(45) Date of Patent: Nov. 5, 2013

(54) METHODS OF FORMING POLYCRYSTALLINE DIAMOND CUTTING ELEMENTS, CUTTING ELEMENTS SO FORMED AND DRILL BITS SO EQUIPPED

(75) Inventor: Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 297 days.

(21) Appl. No.: 12/688,473

(22) Filed: Jan. 15, 2010

(65) Prior Publication Data

US 2010/0181117 A1 Jul. 22, 2010

Related U.S. Application Data

(60) Provisional application No. 61/145,155, filed on Jan. 16, 2009.

(51) Int. Cl.
*E21B 10/36* (2006.01)

(52) U.S. Cl.
CPC ........................................ *E21B 10/36* (2013.01)
USPC ......... 175/433; 175/420.2; 175/425; 175/434

(58) Field of Classification Search
USPC .............. 175/420.2, 425, 426, 428, 433, 434; 419/11
See application file for complete search history.

(56) References Cited

U.S. PATENT DOCUMENTS

| 3,745,623 A | 7/1973 | Wentorf, Jr. et al. |
| 4,224,380 A | 9/1980 | Bovenkerk et al. |
| 5,127,923 A | 7/1992 | Bunting et al. |
| 6,248,447 B1 | 6/2001 | Griffin et al. |
| 6,544,308 B2 | 4/2003 | Griffin et al. |
| 6,601,662 B2 | 8/2003 | Matthias et al. |
| 2005/0230156 A1 | 10/2005 | Belnap et al. |
| 2006/0060390 A1 | 3/2006 | Eyre |
| 2006/0060391 A1 | 3/2006 | Eyre |
| 2006/0060392 A1 | 3/2006 | Eyre |
| 2006/0086540 A1 | 4/2006 | Griffin et al. |

(Continued)

FOREIGN PATENT DOCUMENTS

| EP | 1079063 | 2/2001 |
| JP | 59219500 | 12/1984 |

(Continued)

OTHER PUBLICATIONS

International Search Report for International Application No. PCT/US2010/021097 mailed Aug. 25, 2010, 3 pages.
International Written Opinion for International Application No. PCT/US2010/021097 mailed Aug. 25, 2010, 4 pages.

*Primary Examiner* — Cathleen Hutchins
(74) *Attorney, Agent, or Firm* — TraskBritt

(57) ABSTRACT

A polycrystalline diamond compact comprising a diamond table is formed in a high-pressure, high-temperature process using a catalyst, the catalyst being substantially removed from the entirety of the diamond table, and the diamond table attached to a supporting substrate in a subsequent high-pressure, high-temperature process using a binder material differing at least in part from a material of the catalyst. The binder material is permitted to penetrate substantially completely throughout the diamond table from an interface with the substrate to and including a cutting surface, and the binder material is selectively removed from a region or regions of the diamond table by a conventional technique (e.g., acid leaching). Cutting elements so formed and drill bits equipped with such cutting elements are also disclosed.

16 Claims, 2 Drawing Sheets

(56) References Cited

U.S. PATENT DOCUMENTS

| | | |
|---|---|---|
| 2008/0185189 A1* | 8/2008 | Griffo et al. ............... 175/433 |
| 2008/0223623 A1 | 9/2008 | Keshavan et al. |
| 2008/0230280 A1 | 9/2008 | Keshavan et al. |
| 2009/0152018 A1 | 6/2009 | Sani |

FOREIGN PATENT DOCUMENTS

| | | |
|---|---|---|
| KR | 1020050073989 A | 7/2005 |
| WO | 2004106003 | 12/2004 |
| WO | 2004106004 | 12/2004 |
| WO | 2005110648 | 11/2005 |

* cited by examiner

METHODS OF FORMING POLYCRYSTALLINE DIAMOND CUTTING ELEMENTS, CUTTING ELEMENTS SO FORMED AND DRILL BITS SO EQUIPPED

CROSS-REFERENCE TO RELATED APPLICATION

This application claims the benefit of U.S. Provisional Application Ser. No. 61/145,155, filed Jan. 16, 2009, the disclosure of which application is incorporated herein in its entirety by reference.

TECHNICAL FIELD

Embodiments of the invention relate to methods of forming polycrystalline diamond cutting elements having at least a portion of a diamond table substantially free of catalytic material, and to cutting elements so formed.

BACKGROUND

Superabrasive cutting elements in the form of Polycrystalline Diamond Compact (PDC) structures have been commercially available for almost four decades, and PDC cutting elements having a polycrystalline diamond table formed on the end of a supporting substrate for a period in excess of twenty years. The latter type of PDC cutting elements commonly comprises a thin, substantially circular disc (although other configurations are available), commonly termed a "table," including a layer of superabrasive material formed of diamond crystals mutually bonded under ultrahigh temperatures and pressures and defining a substantially planar front cutting face, a rear face and a peripheral or circumferential edge, at least a portion of which is employed as a cutting edge to cut the subterranean formation being drilled by a drill bit on which the PDC cutting element is mounted. PDC cutting elements are generally bonded over their rear face during formation of the superabrasive table to a backing layer or substrate formed of tungsten carbide, although self-supporting PDC cutting elements are also known, particularly those stable at higher temperatures, which are known as Thermally Stable Polycrystalline Diamond, or "TSPs." Such cutting elements are widely used on rotary fixed cutter, or "drag," bits, as well as on other bits and tools used to drill and ream subterranean formations, such other bits and tools including without limitation core bits, bi-center bits, eccentric bits, hybrid (e.g., rolling components in combination with fixed cutting elements), roller cone bits, reamer wings, expandable reamers, and casing milling tools. As used herein, the term "drill bit" encompasses all of the foregoing, and equivalent structures.

In the formation of either type of cutting element, a catalyst is usually employed to stimulate diamond-to-diamond bonding of the diamond crystals. Unfortunately, the presence of a catalyst in the diamond table may lead to thermal degradation commencing at about 400° C. due to differences in the coefficients of thermal expansion (CTEs) of the diamond and the catalyst, and commencing around 700° C.-750° C. due to stimulation of back-graphitization of the diamond to carbon by the catalyst. Such temperatures may be reached by the cutting edge of a PDC cutting element during drilling of a formation, despite the use of drilling fluid as a cooling agent and despite relatively rapid heat transfer into the diamond table, the substrate and the body of the drill bit on which the cutting element is mounted.

It has been recognized in the art that removal of the catalyst used in the original synthesis manufacturing of the diamond table from the cutting surface of the diamond table, particularly at the cutting edge thereof and along the side of the diamond table proximate the cutting edge and extending toward the substrate, reduces the tendency of those portions of the diamond table to degrade due to thermal effects. Consequently, provided the depth of removal of the catalyst is sufficient, the life of the diamond table is extended. The recognition of the aforementioned thermal degradation effects and how and from what portion of the diamond table the catalyst may be beneficially removed is disclosed in, among many other documents, Japanese Patent JP59-219500, as well as in U.S. Pat. Nos. 4,224,380, 5,127,923, 6,544,308 and 6,601,662, U.S. Patent Publications Nos. 2006/0060390, 2006/0060391, 2006/0060392, 2006/0086540, 2008/0223623, 2009/0152018 and PCT International Publication Nos. WO 2004/106003, WO 2004/106004 and WO 2005/110648. The disclosure of each of the foregoing documents is hereby incorporated herein in its entirety by this reference.

BRIEF SUMMARY OF THE INVENTION

Embodiments of the present invention relate to methods of forming polycrystalline diamond elements, such as cutting elements suitable for subterranean drilling, exhibiting enhanced thermal stability, and resulting cutting elements.

In one embodiment of the invention, a polycrystalline diamond compact comprising a diamond table is formed in a high-pressure, high-temperature process using a catalyst, and the catalyst is then substantially removed from the entirety of the diamond table. The diamond table is then attached to a supporting substrate in a subsequent high-pressure, high-temperature process using a binder material differing at least in part from a material of the catalyst. The subsequent high-temperature, high-pressure process may be conducted at a pressure comparable to that used to form the diamond table, or may conducted at a higher pressure or a lower pressure. Different temperatures may also be employed, respectively, to form the diamond table and during attachment of the diamond table to a supporting substrate.

In one specific embodiment, the binder material is permitted to penetrate substantially completely throughout the diamond table from an interface with the substrate to a cutting surface and side of the diamond table, and the binder material is selectively removed from a desired region or regions of the diamond table by a conventional technique.

Cutting elements formed and exhibiting structures according to embodiments of the methods of the present invention are also disclosed, and encompassed within the scope of the invention.

Drill bits employing cutting elements formed and exhibiting structures according to embodiments of the present invention are also disclosed and encompassed within the scope of the invention.

Other features and advantages of the present invention will become apparent to those of ordinary skill in the art through consideration of the ensuing description, the accompanying drawings, and the appended claims.

DETAILED DESCRIPTION

Figure 1:
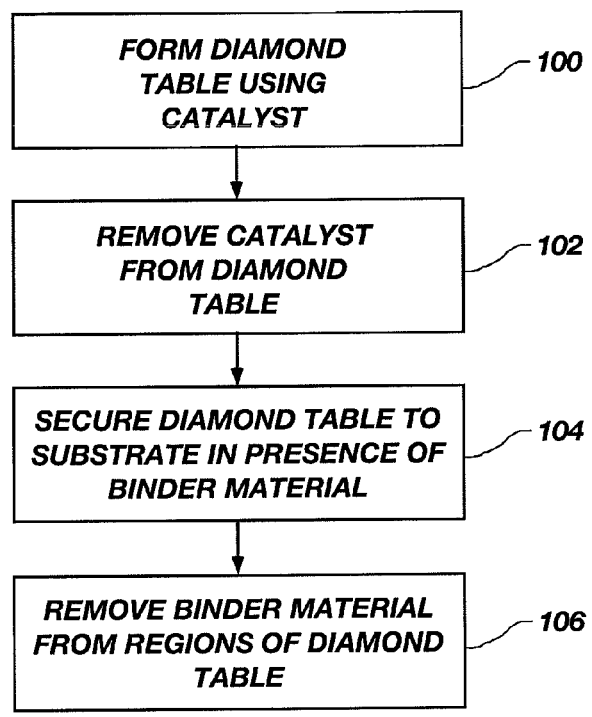
FIG. 1 is a flowchart of an embodiment of a method to form a polycrystalline diamond compact cutting element according to the present invention.

Process flow of an embodiment of a method of the present invention is illustrated in FIG. 1, and the associated structures formed during the process are illustrated in FIGS. 2A-2D. Referring to the foregoing drawing figures, in act 100, a polycrystalline diamond compact 200 (FIG. 2A) in the form of diamond table 202 is formed from a mass of diamond particles (e.g., grit) in the presence of a catalyst 204 in a high-pressure, high-temperature process. As used herein, the terms diamond "particles" or diamond "grit" each include not only individual particles of diamond, but aggregates of individual diamond particles having diamond-to-diamond bonds therebetween. The diamond table 202 may be formed on a supporting substrate 206 (as shown) of cemented tungsten carbide or other suitable material as known in the art in a conventional process of the type described, by way of non-limiting example, in U.S. Pat. No. 3,745,623 or may be formed as a freestanding polycrystalline diamond compact (e.g., without supporting substrate) in a similar conventional process as described, by way of non-limiting example, in U.S. Pat. No. 5,127,923. The diamond grit may comprise natural diamond, synthetic diamond, or a mixture, and may comprise diamond grit of different sizes, or diamond grit in layers or other specific regions of different grain sizes or different average grain sizes, and the diamond table or one or more regions thereof may comprise a gradient of different grain sizes. The catalyst 204 may be supplied in a supporting substrate 206, if employed, or may be admixed with the diamond grit. The supporting substrate 206, which is to be removed as described below, may be thin, on the order of a few millimeters, to permit simultaneous fabrication of relatively more diamond tables 202 in a given diamond press cell volume. In act 102, the supporting substrate 206 (if present) is removed from diamond table 202 by leaching the material of the supporting substrate 206 from the diamond table 202 while simultaneously substantially removing the catalyst 204 from the diamond table 202. Specifically, as known in the art and described more fully in the aforementioned U.S. Pat. No. 5,127,923 and in U.S. Pat. No. 4,224,380, aqua regia (a mixture of concentrated nitric acid ($HNO_3$) and concentrated hydrochloric acid (HCl)) may be used to dissolve at least a portion of the supporting substrate 206 (if present), to substantially remove the catalyst 204 from interstitial voids between the diamond crystals of the diamond table 202 and from the crystal surfaces, and to dissolve catalytic binder material at an interface between the supporting substrate 206 and the diamond table 202 resulting in separation therebetween. It is also known to use boiling hydrochloric acid (HCl) and boiling hydrofluoric acid (HF), as well as mixtures of HF and $HNO_3$ in various ratios. Other techniques for catalyst removal are also known in the art.

In additional embodiments, the supporting substrate 206 may be removed from the diamond table 202 prior to removing catalyst 204 from interstitial voids between the diamond crystals of the diamond table 202, or the supporting substrate 206 may be removed from the diamond table 202 after removing catalyst 204 from interstitial voids between the diamond crystals of the diamond table 202. Furthermore, methods other than acid leaching may be used to remove the supporting substrate 206 from the diamond table 204. Such methods may include, for example, one or more of grinding, cutting, and laser ablation.

Figure 2A:
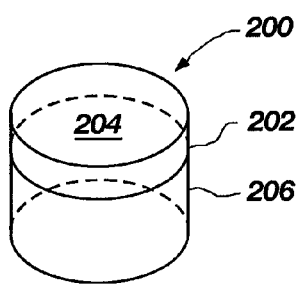
FIGS. 2A-2D depict the formation of a polycrystalline diamond compact cutting element according to the embodiment of FIG. 1.
Figure 2B:
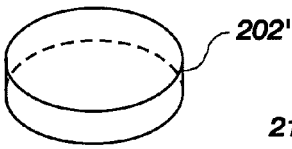
Figure 2C:
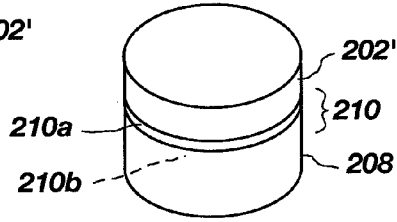

The resulting structure (FIG. 2B) is diamond table 202' with substantially no catalyst 204 present. As used herein, a diamond table or polycrystalline diamond compact having "substantially no catalyst" therein, or being "substantially free of catalyst" does not require complete removal of catalyst, as there may be some residual catalyst on the surfaces of diamond grit particles, as well as in some substantially closed voids between particles wherein the leaching agent has not penetrated fully. In act 104, another supporting substrate 208 is placed adjacent diamond table 202' and secured thereto in another conventional high-temperature, high-pressure process in the presence of a binder material differing at least in part from a material of the catalyst 204. Supporting substrate 208 may comprise a cemented tungsten carbide or other suitable material as known to those of ordinary skill in the art. As depicted in FIG. 2C, binder material 210 may be present at the commencement of act 104 in (for example) powder form or in the form of a thin disc 210a in a layer disposed between diamond table 202' and supporting substrate 208, as an integral portion 210b of the material of supporting substrate 208, or both. At the conclusion of act 104, polycrystalline diamond compact 200' having diamond table 202" including binder material 210 therein results due to migration of the binder material 210 from the source or sources thereof into interstitial voids between the diamond crystals in the polycrystalline diamond compact 200' that were vacated upon removal of the catalyst 204 therefrom in act 102.

As noted above, the another conventional high-temperature, high-pressure process conducted in the presence of a binder material 210 may be at a temperature and pressure comparable to that used to form the diamond table 202 or may be at a lower pressure and temperature. For example, the diamond table 202 may be formed at a pressure of at least about 5 GPa and a temperature of about 1500° C., while the another high-temperature, high-pressure process may be conducted at a substantially different, higher pressure, such as in the range of about 6 GPa to about 7 GPa, or even as much as about 8 GPa or more, and at a temperature in the range of about 1650° C. to about 2200° C. Conversely, the pressure used to form the diamond table 202' may be in the range of about 6 GPa to about 7 GPa, or even about 8 GPa or more, and the temperature may be in the range of about 1650° C. to about 2200° C., and the another high-temperature, high-pressure process conducted in the presence of a binder material may be conducted at a substantially different, lower pressure, for example at least about 5 GPa, and at a temperature of about 1500° C. to stay within the diamond stable region and prevent back-graphitization of the diamond table 202' during act 104. Such back-graphitization tendencies of the diamond table 202' may be of particular concern in light of catalytic properties of the binder employed. In each of the foregoing examples, only pressure may be varied while temperatures employed to respectively form diamond table 202 and attach diamond table 202' to supporting substrate 208 may be substantially the same. Conversely, temperatures may also be varied in the two respective acts 100 and 104. Furthermore, the times at temperature and pressure for each of the processes may vary in a range extending from about twenty seconds to about twenty minutes or more.

In the first example set forth in the above paragraph, the diamond table 202 may be formed at a relatively lower temperature and pressure to produce a diamond-to-diamond bonded structure of lesser density and greater porosity to facilitate removal of catalyst 204 using an acid leaching or other conventional, invasive process. Subsequently, attachment of diamond table 202' to supporting substrate 208 may be conducted at a significantly higher (e.g., by about an additional ten percent or more) pressure and temperature to enhance the density and strength of the resulting diamond table 202". In the second example set forth in the above paragraph, the relatively higher pressure and temperature used to form diamond table 202 will provide a diamond structure of high density and strength, while the relatively lower pressure and temperature used to attach diamond table 202' to supporting substrate 208 will not compromise the density and strength of the resulting diamond table 202" while reducing cycle time for addition of binder material 210 and attachment of substrate 208.

Figure 2D:
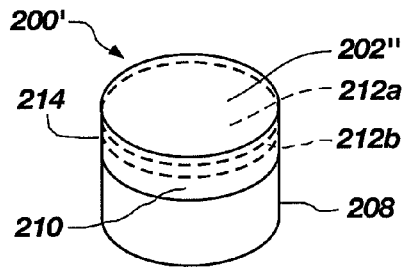

In a further act 106, a region or regions 212a, 212b of the diamond table 202" (being, respectively and by way of non-limiting example, a region adjacent a cutting face and a region adjacent a side surface 214 of diamond table 202") have the binder material 210 substantially and selectively removed therefrom while precluding contact with the supporting substrate 208 and, by way of non-limiting example, a portion of the side surface 214 of diamond table 202" with a leaching agent. Of course, the binder material 210 may be removed from diamond table 202" to any substantial extent, or depth, desired. Suitable depths may range from, by way of non-limiting example, about 0.04 mm to about 0.5 mm. Any of the abovementioned leaching agents may be employed, and one particularly suitable leaching agent is hydrochloric acid (HCl) at a temperature of above 110° C. for a period of about three to about 60 hours, depending upon the depth of desired removal of the binder material 210 from a surface of diamond table 202" exposed to the leaching agent, as depicted in FIG. 2D. Contact with the leaching agent may be precluded, as known in the art, by encasing substrate 208 and a portion of the diamond table 202" in a plastic resin, by coating substrate 208 and a portion of the diamond table 202" with a masking material, or by the use of an "O" ring-type seal resistant to the leaching agent, compressed against the side surface 214 of diamond table 202" using a plastic fixture. The resulting polycrystalline diamond compact 200" offers enhanced thermal stability and consequently improved wear resistance, during use due to the removal of binder material 210 from at least the region or regions 212a, 212b of diamond table 202". The presence of binder material in another region or regions of the diamond table 202" may enhance durability and impact strength thereof. The inventor herein has noted, surprisingly and contrary to conventional thought in the industry, that the strength of the resulting diamond table having a binder introduced therein after the initial removal of catalyst therefrom, is substantially the same as that of a diamond table having catalyst therein used to form the diamond table, for diamond tables of equal diamond density.

By way of non-limiting example, materials suitable for use as catalysts and binder materials in implementation of embodiments of the invention include Group VIII elements and alloys thereof, such as Co, Ni, Fe and alloys thereof. Thus, in one implementation, Co may be used as a catalyst in formation of a polycrystalline diamond compact, which is then leached of the catalyst and the supporting substrate removed. Ni may then be used as a binder material to attach the resulting leached diamond table to another supporting substrate. In another implementation, an Fe alloy is used as a catalyst in formation of a polycrystalline diamond compact, which is then leached of the catalyst and the supporting substrate removed. Co may then be used as a binder material to attach the resulting leached diamond table to another supporting substrate. In another implementation, Co may be used as a catalyst in formation of a polycrystalline diamond compact, which is then leached of the catalyst and the supporting substrate removed. A Co/Ni alloy may then be used as a binder material to attach the resulting leached diamond table to another supporting substrate. In a variation of the foregoing implementation, Co may be used as a catalyst in formation of a polycrystalline diamond compact, which is then leached of the catalyst and the supporting substrate removed. An Fe/Ni alloy may then be used as a binder material to attach the resulting leached diamond table to another supporting substrate. As noted above, the binder material 210 may be incorporated into a cemented tungsten carbide or other suitable substrate, may be applied to an interface between the leached diamond table and the another supporting substrate, or both. In a further variation, binder material 210 may be placed adjacent a surface or surfaces (for example, a surface of diamond table 202' opposite substrate 210) to facilitate introduction of binder material 210 into diamond table 202' in act 104.

Figure 3:
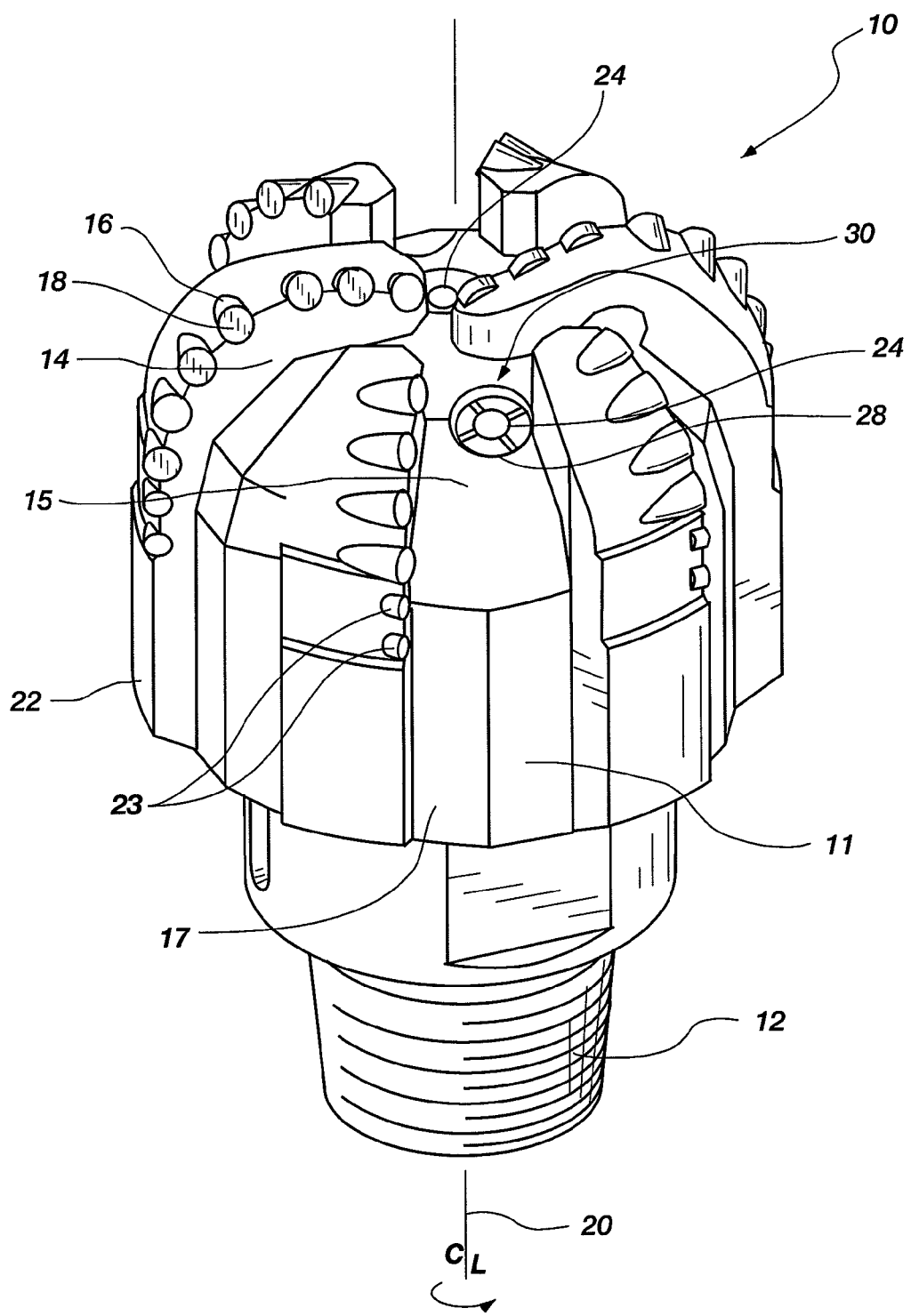
FIG. 3 depicts one example of a rotary drag bit having cutting elements according to an embodiment of the present invention mounted thereto.

Referring to FIG. 3 of the drawings, drill bit 10 in the form of a rotary drag bit is shown. The drill bit 10 includes bit body 11. The drill bit 10 includes conventional male threads 12 on a shank thereof configured to API standards and adapted for connection to a component of a drill string, not shown. The face 14 of the bit body 11 has mounted thereon a plurality of cutting elements 16, at least some of which exhibit structure according to an embodiment of a cutting element of the present invention, each cutting element 16 comprising polycrystalline diamond compact (PDC) table 18 formed on a supporting carbide substrate. The cutting elements 16 are positioned to cut a subterranean formation being drilled while the drill bit 10 is rotated under weight-on-bit (WOB) in a borehole about centerline 20. The bit body 11 may include gage trimmers 23, at least some of which may exhibit structure according to an embodiment of a cutting element of the present invention, each gage trimmer 23 including one of the aforementioned PDC tables 18, such tables 18 being configured with an edge (not shown) to trim and hold the gage diameter of the borehole, and pads 22 on the gage, which contact the walls of the borehole and stabilize the drill bit 10 in the hole. As used herein, the term "drill bit" includes and encompasses drag bits, roller cone bits, hybrid bits, reamers, mills and other subterranean tools for drilling and enlarging well bores.

During drilling, drilling fluid is discharged through nozzle assemblies 30 located in nozzle ports 28 in fluid communication with the face 14 of bit body 11 for cooling the PDC tables 18 of cutting elements 16 and removing formation cuttings from the face 14 of drill bit 10 into passages 15 and junk slots 17. The apertures 24 of nozzle assemblies 30 may be sized for different fluid flow rates depending upon the desired flushing required at each group of cutting elements 16 to which a particular nozzle assembly 30 directs drilling fluid.

Although the foregoing description contains many specifics and examples, these are not limiting the scope of the present invention, but merely as providing illustrations of some embodiments. Similarly, other embodiments of the invention may be devised that do not depart from the scope of the present invention. The scope of this invention is, therefore, indicated and limited only by the appended claims and their legal equivalents, rather than by the foregoing description. All additions, deletions and modifications to the invention as disclosed herein and which fall within the meaning of the claims are embraced within their scope.

What is claimed is:

1. A method of forming a polycrystalline diamond element, the method comprising:
    forming a polycrystalline diamond compact from diamond particles at a temperature and a pressure sufficient to form diamond-to-diamond bonds in the presence of a catalyst comprising one of a Group VIII element and an alloy thereof;
    substantially removing the catalyst from the polycrystalline diamond compact; and
    securing the polycrystalline diamond compact having the catalyst substantially removed therefrom to a supporting substrate at a temperature and a pressure sufficient to maintain stability of diamond-to-diamond bonds in the polycrystalline diamond compact in the presence of a binder material differing at least in part from a material of the catalyst and comprising one of a Group VIII element and an alloy thereof, and to introduce the binder material into interstitial voids between diamond particles of the polycrystalline diamond compact and substantially fill the polycrystalline diamond compact with the binder material.

2. The method of claim 1, wherein substantially removing the catalyst from the polycrystalline diamond compact is effected by leaching.

3. The method of claim 2, further comprising forming the polycrystalline diamond compact on a supporting substrate, and removing the supporting substrate on which the polycrystalline diamond compact is formed after formation of the polycrystalline diamond compact.

4. The method of claim 2, further comprising forming the polycrystalline diamond compact as a freestanding structure.

5. The method of claim 1, further comprising removing the binder material from at least one region of the polycrystalline diamond compact.

6. The method of claim 5, wherein the binder material is removed from the at least one region of the polycrystalline diamond compact by leaching.

7. The method of claim 5, wherein removing the binder material from at least one region of the polycrystalline diamond compact comprises removing the binder material from at least one of at least a portion of a cutting face of the polycrystalline diamond compact and at least a portion of a side surface of the polycrystalline diamond compact.

8. The method of claim 1, wherein at least one of the temperature and the pressure used to form the polycrystalline diamond compact is higher than a respective temperature or pressure used to secure the polycrystalline diamond compact having the catalyst substantially removed therefrom to the supporting substrate.

9. The method of claim 1, wherein at least one of the temperature and pressure used to form the polycrystalline diamond compact is lower than a respective temperature or pressure used to secure the polycrystalline diamond compact having the catalyst substantially removed therefrom to the supporting substrate.

10. The method of claim 1, wherein the pressure used to form the polycrystalline diamond compact is substantially different from the pressure used to secure the polycrystalline diamond compact to the supporting substrate.

11. A polycrystalline diamond element, comprising:
    a polycrystalline diamond compact formed using a catalyst comprising one of a Group VIII element and an alloy thereof, the polycrystalline diamond compact being substantially free of the catalyst; and
    a supporting substrate secured to the polycrystalline diamond compact;
    wherein the polycrystalline diamond element comprises a binder material differing at least in part from a material of the catalyst and comprising one of a Group VIII element and an alloy thereof in at least a majority of interstitial voids between diamond particles of the polycrystalline diamond compact vacated upon removal of the catalyst.

12. The polycrystalline diamond element of claim 11, wherein at least one region of the polycrystalline diamond element is substantially free of the binder material.

13. The polycrystalline diamond element of claim 12, wherein the at least one region comprises at least one of a region adjacent a cutting face and a region adjacent a side surface of the polycrystalline diamond compact.

14. A drill bit for drilling subterranean formations, comprising:
    a body;
    structure for connection of the body to a drill string;
    at least one cutting element secured to the body for engaging a subterranean formation, the at least one cutting element comprising a polycrystalline diamond element comprising:
        a polycrystalline diamond compact formed using a catalyst comprising one of a Group VIII element and an alloy thereof, the polycrystalline diamond compact being substantially free of the catalyst; and
        a supporting substrate secured to the polycrystalline diamond compact;
        wherein the polycrystalline diamond element comprises a binder material differing at least in part from a material of the catalyst and comprising one of a Group VIII element and an alloy thereof in at least a majority of interstitial voids between diamond particles of the polycrystalline diamond compact vacated upon removal of the catalyst.

15. The drill bit of claim 14, wherein at least one region of the polycrystalline diamond element is substantially free of the binder material.

16. The drill bit of claim 15, wherein the at least one region comprises at least one of a region adjacent a cutting face and a region adjacent a side surface of the polycrystalline diamond compact.

* * * * *